United States Patent
Yang et al.

(10) Patent No.: US 10,406,831 B2
(45) Date of Patent: Sep. 10, 2019

(54) THERMOFORMABLE OVERCOAT IN ROLL-TO-ROLL FORMAT PRINTERS FOR THERMOFORMING APPLICATIONS

(71) Applicant: Xerox Corporation, Norwalk, CT (US)

(72) Inventors: Xin Yang, Webster, NY (US); Mandakini Kanungo, Penfield, NY (US); Peter J. Knausdorf, Henrietta, NY (US); Anthony Salvatore Condello, Webster, NY (US); Jack Thomas LeStrange, Macedon, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/711,621

(22) Filed: Sep. 21, 2017

(65) Prior Publication Data
US 2019/0084330 A1    Mar. 21, 2019

(51) Int. Cl.
  *B41J 11/00*   (2006.01)
  *C09D 11/101*  (2014.01)
  *B41J 3/407*   (2006.01)
  *B41J 15/04*   (2006.01)

(52) U.S. Cl.
  CPC ............ *B41J 11/002* (2013.01); *B41J 3/407* (2013.01); *B41J 11/0015* (2013.01); *B41J 15/04* (2013.01); *C09D 11/101* (2013.01)

(58) Field of Classification Search
  CPC . B41J 11/002; B41J 15/16; B41J 3/407; B41J 2/2117; B41J 3/4078; B41M 3/008; B41M 7/0081; B41M 5/0023; B41M 5/0047; C09D 11/101
  See application file for complete search history.

(56) References Cited

U.S. PATENT DOCUMENTS

| | | |
|---|---|---|
| 9,827,790 B1 | 11/2017 | Moore et al. |
| 2006/0082604 A1 | 4/2006 | Florence et al. |
| 2008/0111874 A1 | 5/2008 | Gouch |
| 2009/0135239 A1 | 5/2009 | Chretien et al. |
| 2009/0244146 A1 | 10/2009 | Chiwata |
| 2011/0243581 A1 | 10/2011 | Viturro et al. |
| 2013/0164502 A1 | 6/2013 | Ghiam et al. |

(Continued)

FOREIGN PATENT DOCUMENTS

JP    WO 2015/093405 A1 *  6/2015  ............ B65D 8/00

OTHER PUBLICATIONS

Fujifilm, Acuity Series, Product Brochure, document created Sep. 2, 2016.

(Continued)

*Primary Examiner* — Geoffrey S Mruk
(74) *Attorney, Agent, or Firm* — Simpson & Simpson, PLLC

(57) ABSTRACT

A system for printing at least one stretchable ink on a thermoformable substrate including a first surface and a second surface opposite the first surface. The system includes an unwinder, a printing module and a rewinder. The unwinder is arranged to feed the thermoformable substrate from a first roll into a printing module. The printing module includes a flood coater arranged to deposit a coating layer on the first surface of the thermoformable substrate. The rewinder is arranged to receive the thermoformable substrate and to form the thermoformable substrate into a second roll.

12 Claims, 8 Drawing Sheets

(56) References Cited

U.S. PATENT DOCUMENTS

| | | |
|---|---|---|
| 2013/0288018 A1 | 10/2013 | Moller |
| 2014/0049586 A1 | 2/2014 | Fletcher et al. |
| 2014/0078212 A1 | 3/2014 | Nakai et al. |
| 2014/0160197 A1 | 6/2014 | Hirose et al. |
| 2014/0220321 A1 | 8/2014 | Derry et al. |
| 2014/0232790 A1 | 8/2014 | Makuta |
| 2014/0313257 A1 | 10/2014 | Vleck |
| 2015/0251460 A1 | 9/2015 | Imamura et al. |
| 2015/0258811 A1 | 9/2015 | Hiratsuka et al. |
| 2015/0258814 A1 | 9/2015 | Matsumoto et al. |
| 2015/0273873 A1 | 10/2015 | Kitada et al. |
| 2015/0375493 A1 | 12/2015 | Wang et al. |
| 2016/0303879 A1* | 10/2016 | Yamada .................. B41M 1/30 |
| 2017/0341416 A1 | 11/2017 | Yang et al. |
| 2017/0341421 A1 | 11/2017 | Yang et al. |
| 2018/0029381 A1 | 2/2018 | Moore et al. |
| 2018/0126753 A1 | 5/2018 | Yang et al. |

OTHER PUBLICATIONS

Electronics for Imaging, Inkjet Solutions—Inkjet Training Services Optimize your EFI printer's performance and capabilities, document created Oct. 17, 2013.

\* cited by examiner

United States Patent 10,406,831 B2

THERMOFORMABLE OVERCOAT IN ROLL-TO-ROLL FORMAT PRINTERS FOR THERMOFORMING APPLICATIONS

TECHNICAL FIELD

The presently disclosed embodiments are directed to providing a printing system for use with depositing or printing stretchable and/or radiation curable inks on thermoformable substrates and methods of using the same.

BACKGROUND

Print processes compatible with thermoforming processes are known in the art. Conventional digital printers operate by scanning an array of printheads repeatedly across the media web while indexing the travel of the web, i.e., similar to the raster like functioning of traditional ink jet printers. This conventional print process is extremely time consuming in a manufacturing environment in which printed rolls must be delivered to one or more thermoforming presses. Often, the time required to print greatly exceeds the time necessary for thermoforming.

The following are two examples of printing systems used with thermoformable materials. Electronics For Imaging's VUTEk GS Pro-TF Series digital inkjet printer can allegedly produce custom formed signs, packaging, POP displays, vending panels and other thermoforming applications. Similarly, FUJIFILM's Acuity Advance Select is a flatbed inkjet printer used to produce printed thermoforms. Unfortunately, both systems suffer from the drawback of utilizing a scanning printhead which severely limits system throughput, e.g., FUJIFILM's system advertises throughput up to only 32 m$^2$/hr.

Further complicating the process of printing on thermoformable material is the optical characteristics of that material. Many thermoformable materials are transparent, which is a desirable characteristic when being used to hold product that consumers wish to see prior to purchase, e.g., strawberries in a clear plastic container. Clear materials pose a challenge for printing conventional CMYK images (cyan, magenta, yellow and key (black)) since incident light will transmit through the ink. To improve visibility, it is common to print a CMYK image onto a white background having high reflectance. In order to maximize the usefulness of a printing system and minimize costs, preferably the white background is created using the same printing process used for CMYK printing.

Subsequent to printing on the thermoformable material, the material is rewound into a roll. Due to the thermoformability which requires low cross-linking in the cured inks, e.g., ultraviolet (UV) cured inks, it has been found that these inks are prone to "roll offset" failure, also known as "set-off" in the industry. The white ink and/or the CMYK images may transfer from the top surface of the thermoformable material to the bottom surface of the portion of the roll positioned directly adjacent to images in a process commonly known as setting off. In other terms, the printed images, while held in rolled form, migrate from intended locations to unintended locations, thereby resulting in unacceptable print quality. Because of the offset, commercial thermoforming printers typically adopt a wide-format, where the UV cured ink is kept exposed to air before thermoforming. The foregoing greatly limits the productivity for a thermoforming product.

The present disclosure addresses a system and method for high throughput printing on thermoformable substrates without unacceptable setting off of printed images. In other terms, a high-volume roll-to-roll format system for thermoforming applications is needed.

SUMMARY

It has been found that coating a thermoformable clear ink on top of, or over, a printed image minimizes or prevents roll offset, and does not affect the capability of subsequently thermoforming the printed images. In an example embodiment, it has been found that a flexographic ink may be used as an overcoat, and therefore the present systems and methods propose flood coating an ink of this type, or similar type, after printing the inks to form a background layer and/or image, e.g., CMYK inks.

According to aspects illustrated herein, there is provided a system for printing at least one stretchable ink on a thermoformable substrate including a first surface and a second surface opposite the first surface. The system includes an unwinder, a printing module and a rewinder. The unwinder is arranged to feed the thermoformable substrate from a first roll into a printing module. The printing module includes a flood coater arranged to deposit a coating layer on the first surface of the thermoformable substrate. The rewinder is arranged to receive the thermoformable substrate and to form the thermoformable substrate into a second roll.

According to other aspects illustrated herein, there is provided a method for applying an image on a thermoformable substrate having a first surface and a second surface opposite the first surface. The method includes: depositing a coating layer on a portion of the first surface of the substrate with a flood coater, the first portion comprises the image, the coating layer comprising at least one stretchable ink; and, curing the coating layer with at least one radiation curing device.

According to other aspects illustrated herein, there is provided a method for applying an image on a thermoformable substrate having a first surface and a second surface opposite the first surface. The method includes: unwinding the thermoformable substrate from a first roll into a printing module having the coating layer; depositing a background layer on a portion of the first surface of the substrate with at least one first full width printhead array, the background layer including at least one stretchable ink; pinning the background layer with at least one radiation pinning device, the at least one first radiation pinning device positioned proximate the first surface of the thermoformable substrate; depositing a foreground layer on the background layer with at least one second full width printhead array, the foreground layer including at least one stretchable ink; curing the background and foreground layers with at least one radiation curing device; depositing a coating layer on a portion of the first surface of the substrate with a flood coater, the first portion includes the image, the coating layer including at least one stretchable ink; curing the coating layer with at least one radiation curing device; and, rewinding the thermoformable substrate into a second roll.

Other objects, features and advantages of one or more embodiments will be readily appreciable from the following detailed description and from the accompanying drawings and claims.

BRIEF DESCRIPTION OF THE DRAWINGS

Various embodiments are disclosed, by way of example only, with reference to the accompanying drawings in which corresponding reference symbols indicate corresponding parts, in which.

DETAILED DESCRIPTION

Figure 1:
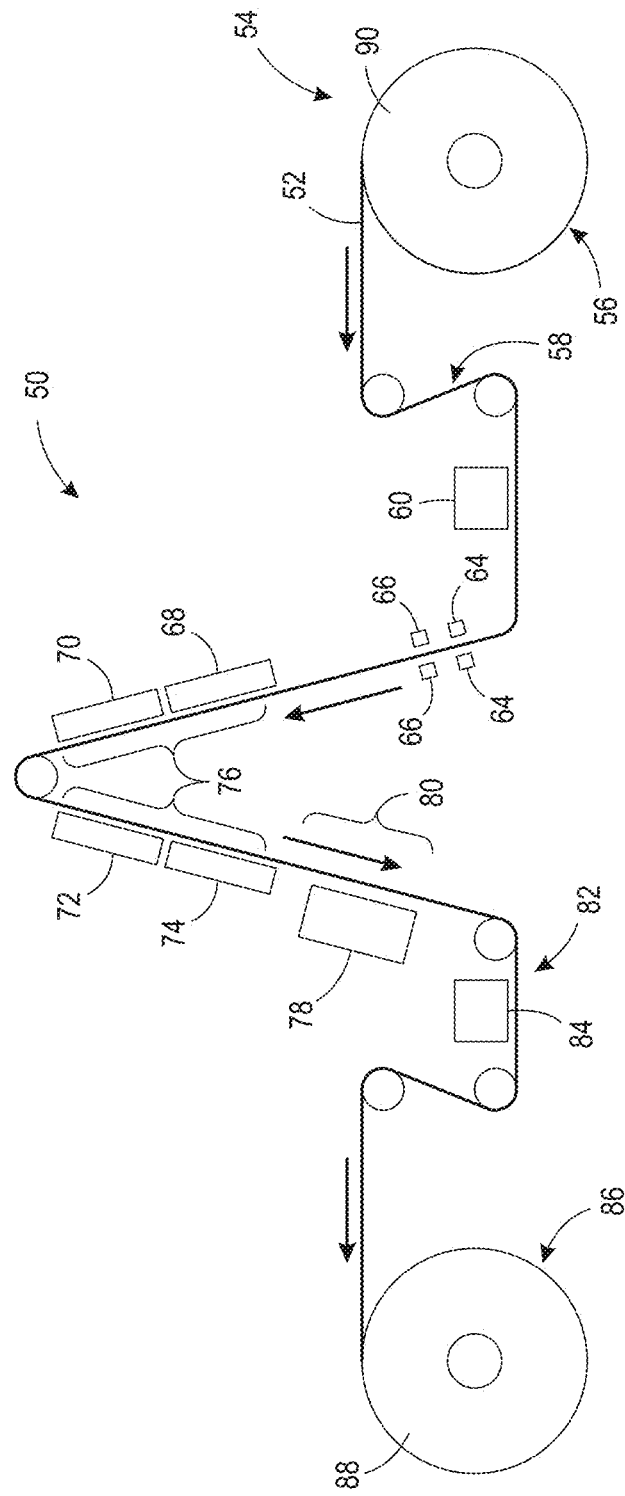
FIG. 1 is a schematic diagram of an embodiment of a known system for printing stretchable ink on a thermoformable substrate.

At the outset, it should be appreciated that like drawing numbers on different drawing views identify identical, or functionally similar, structural elements of the embodiments set forth herein. Furthermore, it is understood that these embodiments are not limited to the particular methodologies, materials and modifications described and as such may, of course, vary. It is also understood that the terminology used herein is for the purpose of describing particular aspects only, and is not intended to limit the scope of the disclosed embodiments, which are limited only by the appended claims.

Unless defined otherwise, all technical and scientific terms used herein have the same meaning as commonly understood to one of ordinary skill in the art to which these embodiments belong. As used herein, "full width", e.g., "full width array sensor" and "full width printhead array", is intended to be broadly construed as any structure that covers a significant width of the substrate. For example, in some embodiments, the length of a full width array sensor is approximately half of the width of the substrate which it inspects.

Furthermore, the words "printer," "printer system", "printing system", "printer device" and "printing device" as used herein encompass any apparatus, such as a digital copier, bookmaking machine, facsimile machine, multi-function machine, etc. which performs a print outputting function for any purpose. Additionally, as used herein, "web", "substrate", "printable substrate" refer to, for example, paper, transparencies, parchment, film, fabric, plastic, photo-finishing papers or other coated or non-coated substrate media in the form of a web upon which information or markings can be visualized and/or reproduced, while a "thermoformable substrate" is intended to mean any substrate capable of being thermoformed after printing, i.e., capable of being shaped by the use of heat and pressure. As used herein, the term 'average' shall be construed broadly to include any calculation in which a result datum or decision is obtained based on a plurality of input data, which can include but is not limited to, weighted averages, yes or no decisions based on rolling inputs, etc.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, although any methods, devices or materials similar or equivalent to those described herein can be used in the practice or testing of these embodiments, some embodiments of methods, devices, and materials are now described.

FIG. 1 depicts a schematic view of an embodiment of a known printing system, i.e., printing system 50. Thermoforming grade substrate 52, e.g., polyethylene terephthalate (PET) or polyvinyl chloride (PVC), is unwound at first end 54 of system 50 in unwinder 56. Web 52 then passes through a conventional web drive and steering subsystem, i.e., subsystem 58. Web 52 is exposed to surface energy modification device 60, e.g., corona discharge, atmospheric plasma, or flame treatment. Surface energy modification device 60 enhances both the wetting and adhesion of ink 62 to web 52. An example of a suitable surface energy modification device is a corona treatment device from Enercon of Milwaukee, Wis. with a typical output power of $$0-100 \frac{W \cdot \min}{m^2}.$$

In some embodiments, printing system 50 may also include web cleaning stations 64 and static neutralization devices 66 to remove excess particles and static charge from the substrate. In some embodiments, stations 64 and devices 66 are located on both sides of web 52 between surface energy modification device 60 and printhead array 68. Web 52 then passes by one or more printhead arrays, e.g., printhead arrays 68, 70, 72 and 74. In some embodiments, each printhead array is composed of multiple piezo printheads arranged so that the full width of web 52, other than inboard and outboard margins, can be addressed by at least one printhead without the need to move or scan the printhead. The foregoing arrangement of printheads allows for a 'single pass' print mode in which web 52 moves continuously through print zone 76, i.e., the area where web 52 passes adjacent to printhead arrays 68, 70, 72 and 74. It has been found that the foregoing embodiments can print over a speed range of 30-120 feet per minute. The full width printhead arrays of system 50 are stationary, i.e., not scanning transversely across web 52, which enables much higher printing throughput than conventional printers.

FIG. 1 shows one printhead array for each of the four conventional colors, i.e., cyan, magenta, yellow and black, also commonly referred to as CMYK. The four printhead arrays are represented by arrays 68, 70, 72 and 74 for the CMYK colors, respectively. An additional array or a plurality of additional arrays can be included for a fifth color, e.g., white, or for a plurality of additional colors. The printhead arrays are responsible for adding digitally defined image content to substrate 52, such as package graphics, instructions, and the like. The printhead arrays may also print non-image marks such as registration marks for subsequent thermoform processing, cutting operations, or other post printing processes that require alignment to the printed image.

It should be appreciated that corresponding ink delivery subsystems for each printhead array are not shown in the figures or discussed in detail herein as such subsystems are generally known in the art of liquid and solid ink printing. Each ink delivery subsystem supplies its corresponding printhead array with a radiation-curable thermoforming ink. It has been found that suitable inks should be formulated to allow for stretching of at least 400% elongation without cracking or losing adhesion to the substrate. However, the extent of necessary stretching is dependent on the thermoforming process and inks providing less than 400% elongation without cracking or loss of adhesion to the substrate may also be suitable for some applications.

After all ink has been deposited onto the substrate, the web then passes through a radiation curing zone, where such radiation source is selected based on the requirements for fully curing the ink. In some embodiments, multiple wide spectrum UV lamps provide curing of the inks, although other devices such as UV spectrum LED arrays may also be used, i.e., the necessary radiation output is dependent on the curing requirements of the ink. Thus, radiation curing device 78 may be selected from the group consisting of: an ultraviolet radiation source; an infrared radiation source; a visible light radiation source; and, combinations thereof, depending on the requirements of the stretchable ink. After web 52 passes through curing zone 80 it passes through sensing subsystem 82 which can be used to detect color-to-color registration, missing jets, and other print quality metrics. In some embodiments, sensing subsystem 82 comprises full width array sensor 84. Web 52 then passes into rewinder 86 where printed web 52 is returned to a roll form, e.g., roll 88.

Printed roll 88 can be used in a thermoforming press and thereby converted into thermoformed objects, e.g., food packaging containers.

In some embodiments, web substrate 52 is 0.014 inch thick thermoforming grade PET, although other thermoformable plastics may also be used. In some embodiments, print resolution of 600 dots per inch (dpi)×600 dpi is acceptable, although other print modes may be used, e.g., 300 dpi×300 dpi.

In view of the foregoing, it should be appreciated that system 50 is capable of printing at least one stretchable ink on a thermoformable substrate, e.g., substrate 52. In some embodiments, system 50 comprises unwinder 56, surface energy modification device 60, at least one full width printhead array, e.g., printhead arrays 68, 70, 72 and 74, at least one radiation curing device, e.g., curing device 78, full width array sensor 84 and rewinder 86. Unwinder 56 is arranged to feed thermoformable substrate 52 from first roll 90 into web drive subsystem 58. Surface energy modification device 60 is arranged to alter a substrate surface energy to enhance wetting and adhesion of the at least one stretchable ink to thermoformable substrate 52. The full width printhead arrays are arranged to deposit the at least one stretchable ink on thermoformable substrate 52. Radiation curing device 78 is arranged to cure the at least one stretchable ink on thermoformable substrate 52. Full width array sensor 84 is arranged to monitor the at least one stretchable ink on thermoformable substrate 52, and rewinder 86 is arranged to receive thermoformable substrate 52 and to form thermoformable substrate 52 into second roll 88.

In some embodiments, each of the at least one stretchable ink is an ultraviolet radiation curable ink; however, other types of inks may also be used. Moreover, in some embodiments, thermoformable substrate 52 is selected from the group consisting of: polyethylene terephthalate; polyethylene terephthalate glycol-modified; polycarbonate; acrylic; polyvinyl chloride; acrylonitrile butadiene styrene; polypropylene; and, combinations thereof.

As described above, surface energy modification may be provided by a variety of devices. In some embodiments, surface energy modification device 60 is selected from the group consisting of: a corona treatment station; an atmospheric plasma treatment station; a flame treatment station; and, combinations thereof. In some embodiments, thermoformable substrate 52 comprises a first width and surface energy modification device 60 comprises a second width/length greater than the first width. Depending on system and printing requirements, it is also within the scope of the claims to have a surface energy modification device that is smaller/shorter than the width of thermoformable or printable substrate 52.

Similarly, in some embodiments, each full width printhead array dispenses a unique stretchable ink. In other terms, each full width printhead array dispenses a particular color unique to that printhead array. Thus, a first full width printhead array 68 may dispense cyan ink, while a second printhead array 70 dispenses magenta ink, a third printhead array 72 dispenses yellow ink, and a fourth printhead array 74 dispenses black ink. In some embodiments, thermoformable substrate 52 comprises a first width and the at least one full width printhead array, e.g., arrays 68, 70, 72 and/or 74, comprises a second width/length less than the first width. Depending on system and printing requirements, some embodiments have printhead arrays that are equal to or greater than the width of the thermoformable or printable substrate. However, in embodiments having printhead arrays with widths/lengths greater than that of the thermoformable substrate, some piezo printheads must be turned off, i.e., the printheads falling outside of the substrate, to avoid waste of ink or damage to the overall system.

Figure 2:
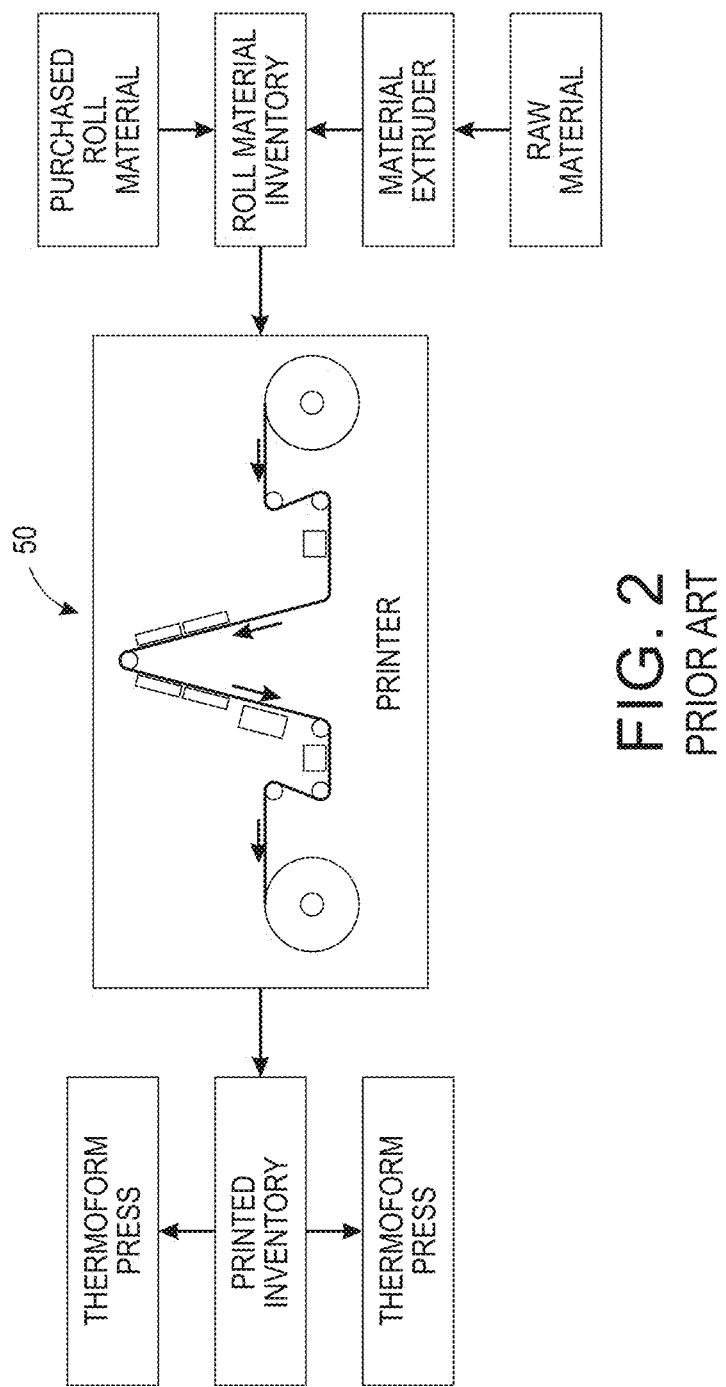
FIG. 2 is a schematic process flow diagram including an embodiment of a known system for printing stretchable ink on a thermoformable substrate.

FIG. 2 depicts a schematic view of a known embodiment of printer 50 within an example of a full thermoforming manufacturing process. The benefits of printing in a roll-to-roll mode are evident versus a fully integrated in-line system. For example, depending on throughput rates of extruders, printers, and thermoform presses, it is possible for a highly flexible and reconfigurable manufacturing process with high uptime if any one component is down for servicing or otherwise unavailable for its contribution to the overall process.

Figure 3:
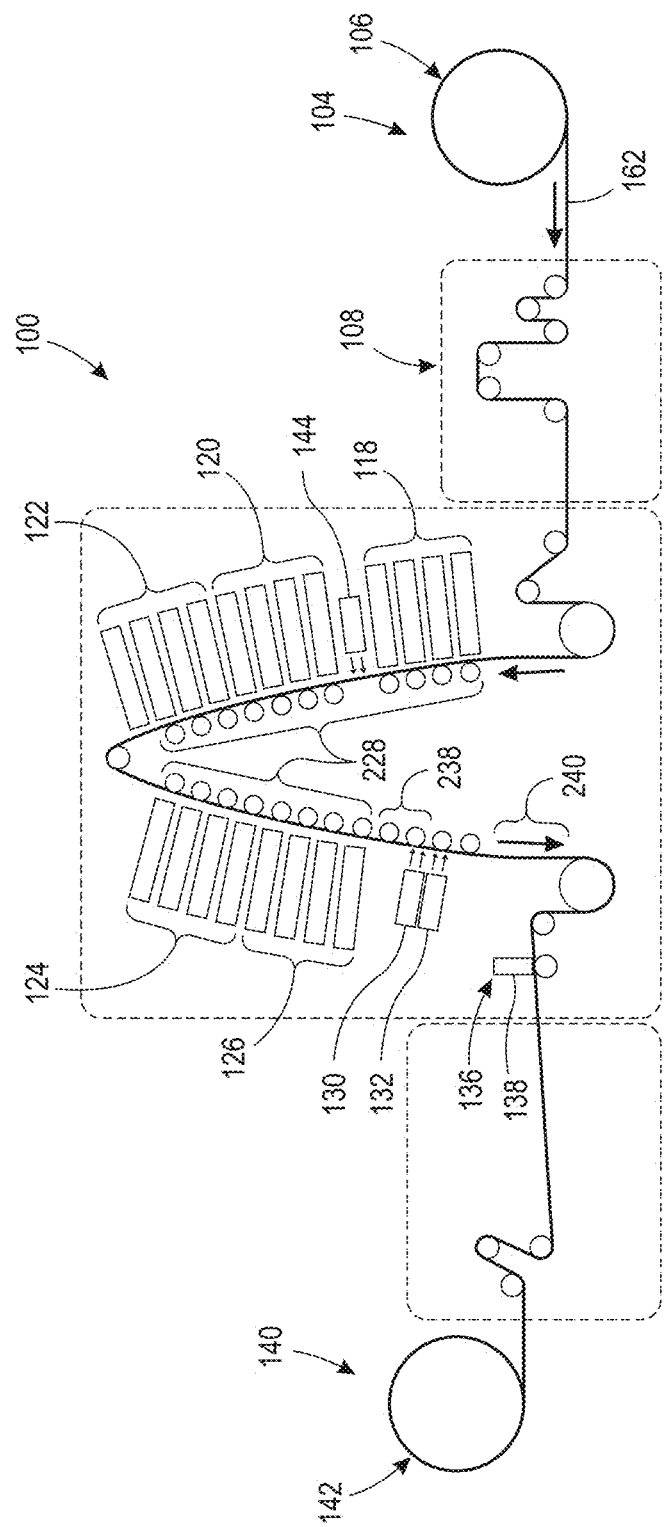
FIG. 3 is a schematic diagram of an embodiment of a known system for printing stretchable ink on a thermoformable substrate.

FIG. 3 depicts a schematic view of another known embodiment of a printing system, i.e., printing system 100. Thermoforming grade substrate 102, e.g., polyethylene terephthalate (PET) or polyvinyl chloride (PVC), is unwound at first end 104 of system 100 in unwinder 106. Web 102 then passes through a conventional web drive and steering subsystem, i.e., subsystem 108. Although not depicted, it should be appreciated that all embodiments described herein may include surface energy modification devices, cleaning stations and/or neutralization devices. Web 102 then passes by one or more printhead arrays, e.g., printhead arrays 118, 120, 122, 124 and 126. In some embodiments, each printhead array is composed of multiple piezo printheads arranged so that the full width of web 102, other than inboard and outboard margins, can be addressed by at least one printhead without the need to move or scan the printhead. The foregoing arrangement of printheads allows for a 'single pass' print mode in which web 102 moves continuously through print zone 128, i.e., the area where web 102 passes adjacent to printhead arrays 118, 120, 122, 124 and 126. It has been found that the foregoing embodiments can print over a speed range of 30-120 feet per minute. The full width printhead arrays of system 100 are stationary, i.e., not scanning transversely across web 102, which enables much higher printing throughput than conventional printers.

After all ink has been deposited onto the substrate, the web then passes through a radiation curing zone, where such radiation source is selected based on the requirements for fully curing the ink. In some embodiments, multiple wide spectrum UV lamps provide curing of the inks, e.g., Type D UV Bulb Lamps, although other devices such as UV spectrum LED arrays may also be used, i.e., the necessary radiation output is dependent on the curing requirements of the ink. Thus, radiation curing devices 130 and 132 may be selected from the group consisting of: an ultraviolet radiation source; an infrared radiation source; a visible light radiation source; and, combinations thereof, depending on the requirements of the stretchable ink. After web 102 passes through curing zone 134 it passes through sensing subsystem 136 which can be used to detect color-to-color registration, missing jets, and other print quality metrics. In some embodiments, sensing subsystem 136 comprises full width array sensor 138. Web 102 then passes into rewinder 140 where printed web 102 is returned to a roll form, e.g., roll 142. Printed roll 142 can be used in a thermoforming press and thereby converted into thermoformed objects, e.g., food packaging containers.

It should be appreciated that as depicted, system 100 includes printhead array 118 arranged to deposit an initial background layer/image, e.g., a white background, which is then pinned with UV LED lamp from 144 the topside of substrate 102. Then, remaining inks, e.g., the CMYK inks, are consecutively printed using printhead arrays 120, 122, 124 and 126 and then cured with UV lamps 130 and 132 to polymerize the printed image and or background. Due to the fact that the inks have a lesser degree of crosslinking, serious offset can be observed in the printed rolls (See, e.g., FIGS. 5 through 8), which not only damages the printed image, but also may damage adjacent images by adhering to the bottom surface of substrate 102, and may lead to safety concerns.

Figure 4:
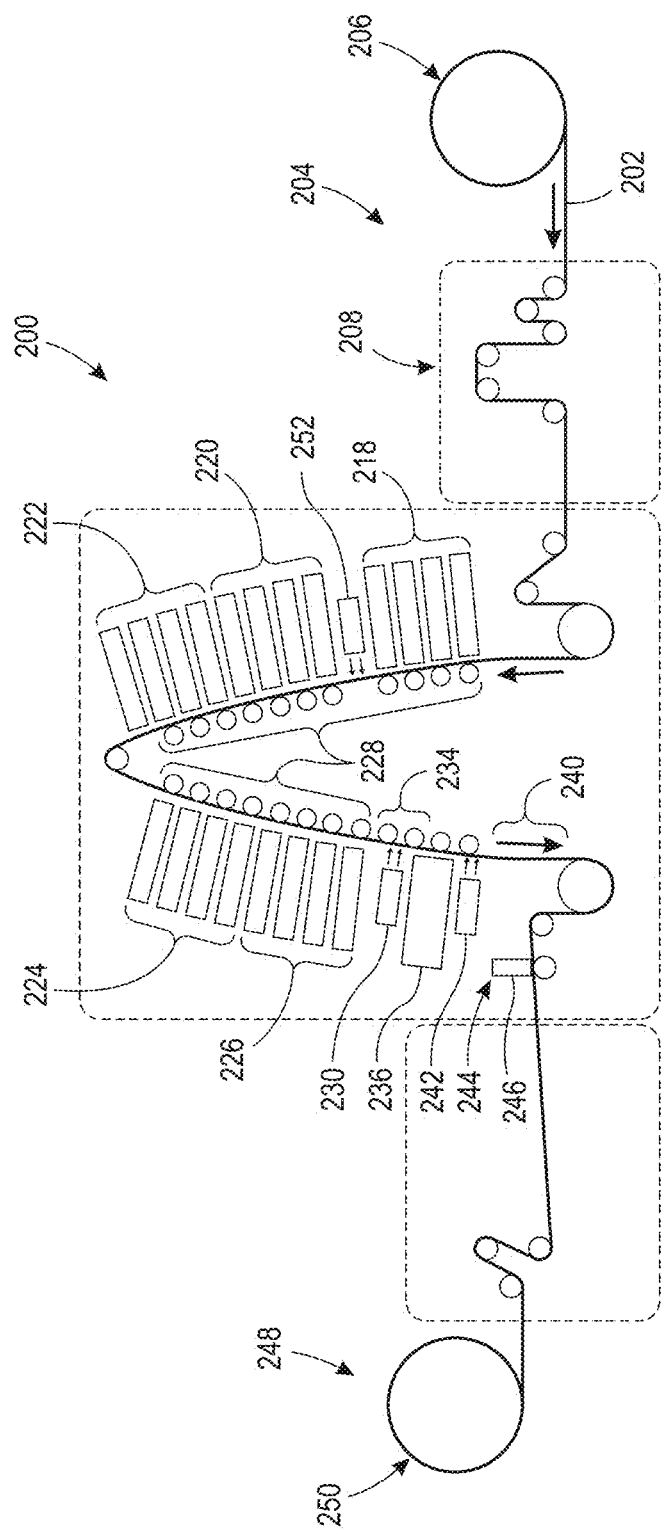
FIG. 4 is a schematic diagram of an embodiment of a present system for printing stretchable ink on a thermoformable substrate comprising a flood coater.
Figure 5:
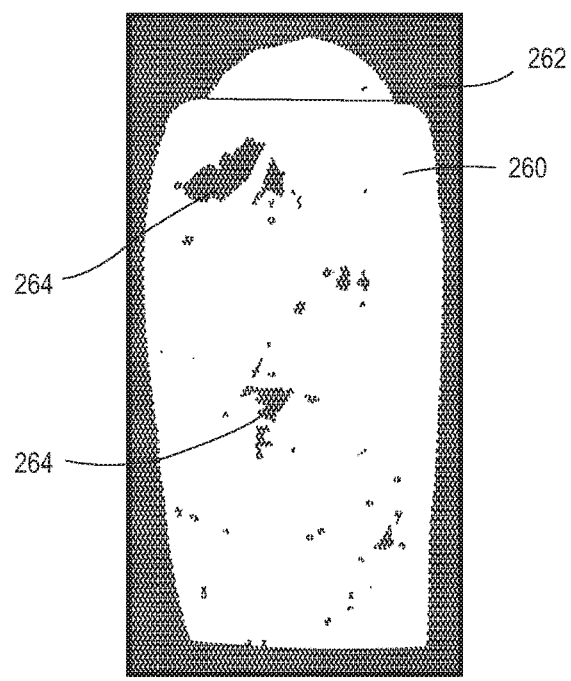
FIG. 5 is an example of a printed substrate produced using a known system for printing stretchable ink on a thermoformable substrate after a single pass under a radiation curing device.
Figure 6:
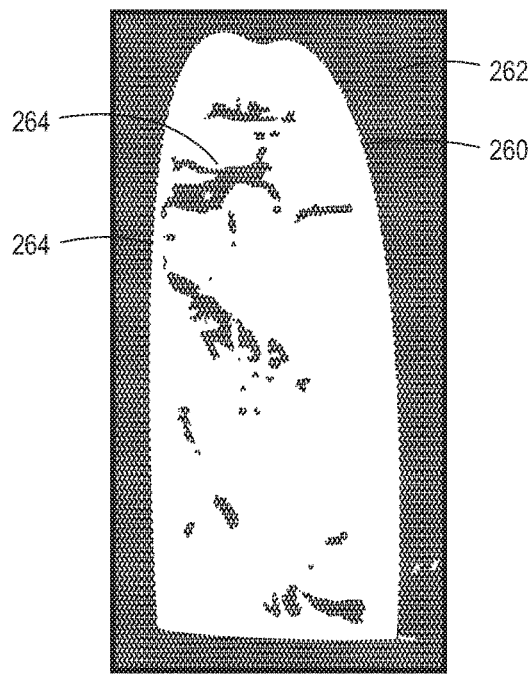
FIG. 6 is an example of a printed substrate produced using a known system for printing stretchable ink on a thermoformable substrate after two passes under a radiation curing device.
Figure 7:
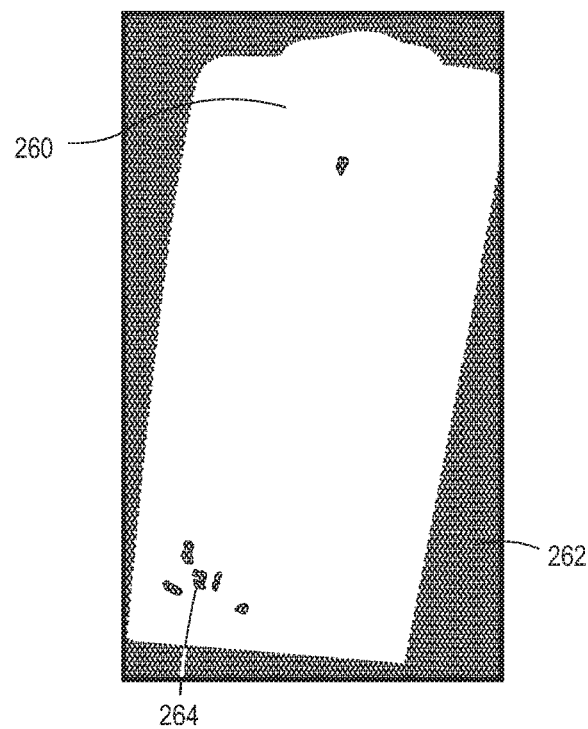
FIG. 7 is an example of a printed substrate produced using a known system for printing stretchable ink on a thermoformable substrate after three passes under a radiation curing device.
Figure 8:
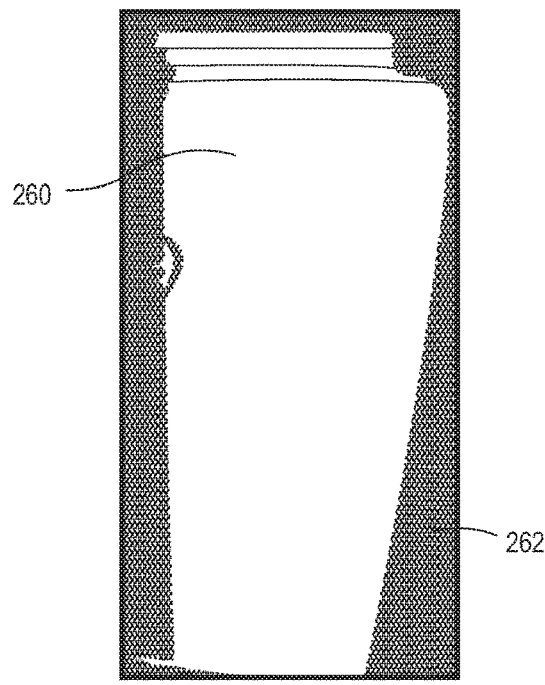
FIG. 8 is an example of a printed substrate produced using a known system for printing stretchable ink on a thermoformable substrate after four passes under a radiation curing device.

FIG. 4 depicts a schematic view of an embodiment of a present printing system, i.e., printing system 200. Thermoforming grade substrate 202, e.g., polyethylene terephthalate (PET) or polyvinyl chloride (PVC), is unwound at first end 204 of system 200 in unwinder 206. Web 202 then passes through a conventional web drive and steering subsystem, i.e., subsystem 208. Although not depicted, it should be appreciated that all embodiments described herein may include surface energy modification devices, cleaning stations and/or neutralization devices. Web 202 then passes by one or more printhead arrays, e.g., printhead arrays 218, 220, 222, 224 and 226. In some embodiments, each printhead array is composed of multiple piezo printheads arranged so that the full width of web 202, other than inboard and outboard margins, can be addressed by at least one printhead without the need to move or scan the printhead. The foregoing arrangement of printheads allows for a 'single pass' print mode in which web 202 moves continuously through print zone 228, i.e., the area where web 202 passes adjacent to printhead arrays 218, 220, 222, 224 and 226. It has been found that the foregoing embodiments can print over a speed range of 30-120 feet per minute. The full width printhead arrays of system 200 are stationary, i.e., not scanning transversely across web 202, which enables much higher printing throughput than conventional printers.

Figure 11:
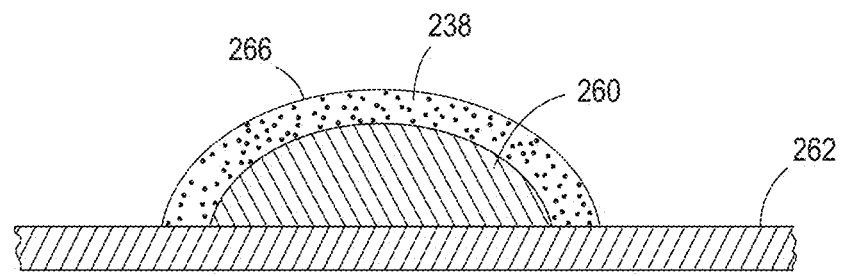
FIG. 11 is a cross sectional view depicting a stretchable ink on a thermoformable substrate comprising a flood coated layer over the stretchable ink.
Figure 12:
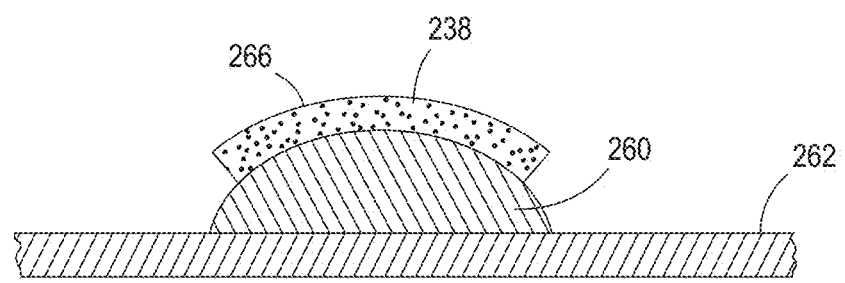
FIG. 12 is a cross sectional view depicting a stretchable ink on a thermoformable substrate comprising a flood coated layer partially over the stretchable ink.

After all ink has been deposited onto the substrate, the web then passes through a first radiation curing zone, where such radiation source is selected based on the requirements for fully curing the ink. In some embodiments, multiple wide spectrum UV lamps provide curing of the inks, e.g., Type D UV Bulb Lamps, although other devices such as UV spectrum LED arrays may also be used, i.e., the necessary radiation output is dependent on the curing requirements of the ink. Thus, radiation curing device 230 may be selected from the group consisting of: an ultraviolet radiation source; an infrared radiation source; a visible light radiation source; and, combinations thereof, depending on the requirements of the stretchable ink. After web 202 passes through first radiation curing zone 234 it passes under flood coater 236. Flood coater 236 is arranged to apply a coating of a curable ink, e.g., flexographic ink, over the printed image and/or background previously deposited on substrate 202. Flood coat 238 may cover all or a portion of the printed image (See, e.g., FIGS. 11 and 12). It should be appreciated that flood coat 238 may comprise a clear ink or alternatively may comprise an ink including a color pigment. A non-limiting example of an acceptable clear coat material is Thermoform TF produced and sold by Inktech International Corporation of Toronto, Ontario. Subsequently, substrate 202 passes through second radiation curing zone 240 wherein second radiation curing device 242 cures flood coat 238 and depending on the printed image and other system arrangements, may also cure the printed image/background. Then, substrate 202 passes through sensing subsystem 244 which can be used to detect color-to-color registration, missing jets, and other print quality metrics. In some embodiments, sensing subsystem 244 comprises full width array sensor 246. Web 202 then passes into rewinder 248 where printed web 202 is returned to a roll form, e.g., roll 250. Printed roll 250 can be used in a thermoforming press and thereby converted into thermoformed objects, e.g., food packaging containers.

Figure 9:
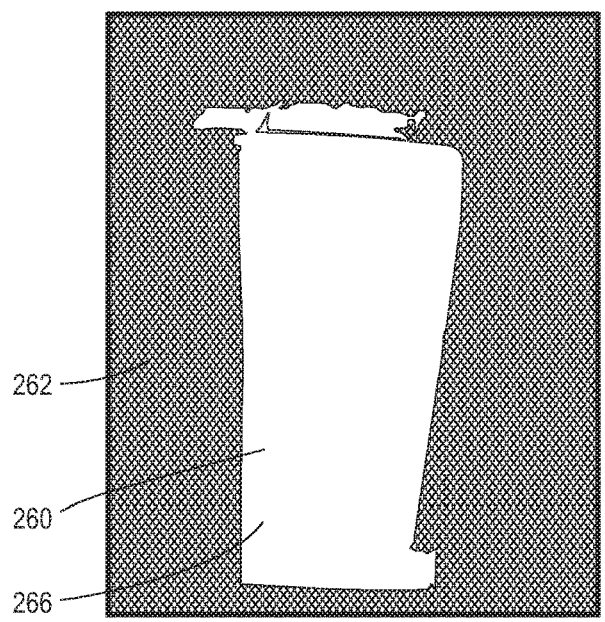
FIG. 9 is an example of a printed substrate produced using a present system for printing stretchable ink on a thermoformable substrate including a flood coating prior to passing under a final radiation curing device.

It should be appreciated that as depicted, system 200 includes printhead array 218 arranged to deposit an initial background layer/image, e.g., a white background, which is then pinned with UV LED lamp from 252 the topside of substrate 202. Then, remaining inks, e.g., the CMYK inks, are consecutively printed using printhead arrays 220, 222, 224 and 226 and then cured with UV lamp 130 to polymerize the printed image and or background. By including flood coater 236 and subsequently curing flood coat 238 over the printed image and/or background, the offset described above is eliminated (See, e.g., FIGS. 9 and 10).

Figure 10:
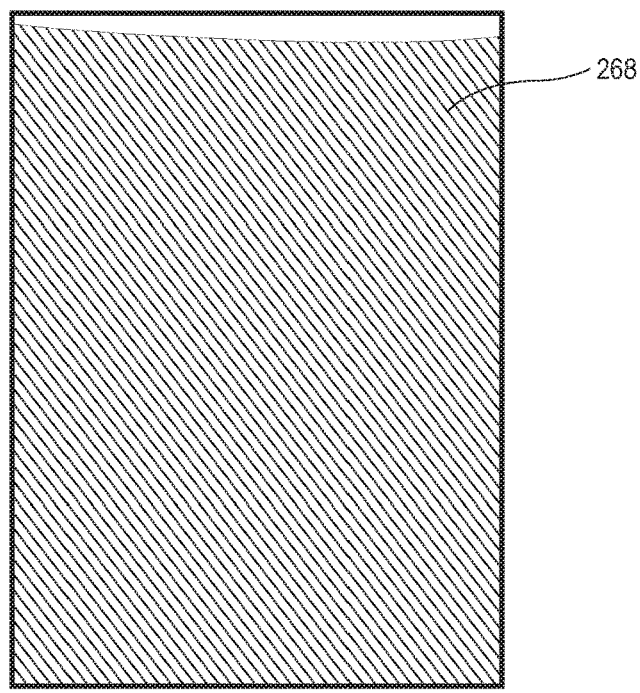
FIG. 10 is an example of a thermoformable substrate after contacting the printed substrate of FIG. 9.

The benefit of including a thermoformable overcoat layer, e.g., flood coat 238, is readily apparent in view of FIGS. 5 through 10. Without an overcoat or flood coat, seven (7) passes under Type D Bulb UV lamps are required to prevent offset of a white ink layer printed on a thermoformable substrate. FIGS. 5 through 8 show results from passing a printed image under Type D Bulb UV lamps one, two, three and four times respectively. As can be seen in the figures, some portion of white ink 260 remained on substrate 262, and some regions of separation also occurred, e.g., regions 264. However, it is impractical to include seven curing lamps within the substrate path as it would greatly increase the cost of the system, as well as the heat from the lamps will distort the substrate. With clear overcoat 266 included over ink 260, there was no offset observed. There was no trace of clear ink 266 offset to cover PET 268 which is shown in FIG. 10. The results of some testing of printed substrates including and not including a final flood coat are summarized herebelow in Table 1.

TABLE 1

| Offset Passes in D Bulb UV | White TF ink | | White TF ink & clear overcoat | |
|---|---|---|---|---|
| | Sample 1 | Sample 2 | Sample 1 | Sample 2 |
| 1 | Fail | Fail | Pass | Pass |
| 2 | Fail | Fail | Pass | Pass |
| 3 | Fail | Fail | Pass | Pass |
| 4 | Fail | Fail | | |
| 5 | Fail | Pass | | |
| 7 | Pass | Pass | | |
| 10 | Pass | Pass | | |

The foregoing results may result from at least the following two reasons. First, the thermoformable clear UV ink may be a flexo ink that has much higher viscosity, i.e., higher molecular weight, than ink-jettable inks, e.g., ink dispensed from printhead arrays 218, 220, 222, 224 and 226. After UV curing, monomers in this type of ink are much less migratable to form an offset. Second, the clear ink has no pigment obscuring the UV light used to cure the ink, enabling light to go through the entire layer to cure the surface and the bulk of the ink. The foregoing method may also be used in other UV jetting applications.

The present systems and methods bring a variety of simultaneous benefits, some of which are follow. A clear thermoformable overcoat prevents offset in wounded rolls in roll-to-roll printing systems. Flexographic inks have greater durability compared to thermoformable inkjet inks, which can substantially increase durability performance of printed inks. A clear overcoat can prevent gloss differences on CMYK prints, resulting from image height variation because of halftone printing techniques. A highly cured and cross-linked clear layer can serve as a barrier to prevent potential safety issues.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for applying an image on a thermoformable substrate comprising a first surface and a second surface opposite the first surface, the method comprising:
    depositing a coating layer on a portion of the first surface of the substrate with a flood coater, the first surface comprises the image, the coating layer comprising at least one stretchable ink; and,
    curing the coating layer with at least one radiation curing device, wherein
    the image and the coating layer are applied to the first surface on the basis that the thermoformable substrate including the image and the coating layer will be subject to a subsequent thermoforming process to form a thermoformed object having a semi-rigid shape.

2. The method of claim 1 further comprising, prior to the step of depositing the coating layer:
    unwinding the thermoformable substrate from a first roll into a printing module comprising the coating layer.

3. The method of claim 1 further comprising, after the step of curing the coating layer:
    rewinding the thermoformable substrate into a first roll.

4. The method of claim 1 further comprising, prior to the step of depositing the coating layer:
    depositing a background layer on a portion of the first surface of the substrate with at least one first full width printhead array, the background layer comprising at least one stretchable ink; and,
    pinning the background layer with at least one radiation pinning device, the at least one first radiation pinning device positioned proximate the first surface of the thermoformable substrate.

5. The method of claim 4 further comprising, after the step of depositing the background layer and prior to the step of depositing the coating layer:
    depositing a foreground layer on the background layer with at least one second full width printhead array, the foreground layer comprising at least one stretchable ink; and,
    curing the background and foreground layers with at least one radiation curing device.

6. The method of claim 1 further comprising, prior to the step of depositing the coating layer:
    depositing an image on a portion of the first surface of the substrate with at least one first full width printhead array, the image comprising at least one stretchable ink; and,
    curing the image with at least one radiation curing device, the at least one first radiation curing device positioned proximate the first surface of the thermoformable substrate.

7. The method of claim 1 further comprising, prior to the step of depositing the coating layer:
    depositing a background layer on a portion of the first surface of the substrate with at least one first full width printhead array, the background layer comprising at least one stretchable ink; and, pinning the background layer with at least one radiation pinning device, the at least one first radiation pinning device positioned proximate the first surface of the thermoformable substrate;

depositing a foreground layer on the background layer with at least one second full width printhead array, the foreground layer comprising at least one stretchable ink; and, curing the background and foreground layers with at least one radiation curing device.

8. The method for applying an image on a thermoformable substrate of claim 1, wherein the thermoformable substrate has a thickness of about 0.014 inches.

9. The method for applying an image on a thermoformable substrate of claim 1, wherein the image and the coating layer are applied on the basis that the image and the coating layer will be affected by the subsequent thermoforming process.

10. A method for applying an image on a thermoformable substrate comprising a first surface and a second surface opposite the first surface, the method comprising:

unwinding the thermoformable substrate from a first roll into a printing module comprising the coating layer;

depositing a background layer on a portion of the first surface of the substrate with at least one first full width printhead array, the background layer comprising at least one stretchable ink;

pinning the background layer with at least one radiation pinning device, the at least one first radiation pinning device positioned proximate the first surface of the thermoformable substrate;

depositing a foreground layer on the background layer with at least one second full width printhead array, the foreground layer comprising at least one stretchable ink;

curing the background and foreground layers with at least one radiation curing device;

depositing a coating layer on a portion of the first surface of the substrate with a flood coater, the first surface comprises the image, the coating layer comprising at least one stretchable ink;

curing the coating layer with at least one radiation curing device; and, rewinding the thermoformable substrate into a second roll, wherein the background layer, the foreground layer and coating layer are deposited on the thermoformable substrate on the basis that the thermoformable substrate including the background layer, the foreground layer, and the coating layer will be subject to a subsequent thermoforming process to form a thermoformed object having a semi-rigid shape.

11. The method for applying an image on a thermoformable substrate of claim 10, wherein the thermoformable substrate has a thickness of about 0.014 inches.

12. The method for applying an image on a thermoformable substrate of claim 10, wherein the background layer, the foreground layer and coating layer are applied on the basis that the background layer, the foreground layer and coating layer will be affected by the subsequent thermoforming process.

* * * * *